US008425330B1

(12) United States Patent
Kislyi et al.

(10) Patent No.: US 8,425,330 B1
(45) Date of Patent: Apr. 23, 2013

(54) DYNAMIC BATTLE SESSION MATCHMAKING IN A MULTIPLAYER GAME

(75) Inventors: Victor Kislyi, Minsk (BY); Ivan Mikhnevich, Nicosia (CY)

(73) Assignee: Wargaming.net, LLC, London (GB)

( * ) Notice: Subject to any disclaimer, the term of this patent is extended or adjusted under 35 U.S.C. 154(b) by 0 days.

(21) Appl. No.: 13/472,945

(22) Filed: May 16, 2012

(51) Int. Cl.
*A63F 13/00* (2006.01)

(52) U.S. Cl.
USPC .................................. 463/42; 463/6; 463/32

(58) Field of Classification Search ........... 463/6; 705/1
See application file for complete search history.

(56) References Cited

U.S. PATENT DOCUMENTS

| | | | |
|---|---|---|---|
| 6,023,729 A | 2/2000 | Samuel et al. | |
| 6,322,451 B1 | 11/2001 | Miura | |
| 6,352,479 B1 | 3/2002 | Sparks, II | |
| 6,641,481 B1 | 11/2003 | Mai et al. | |
| 6,648,760 B1 | 11/2003 | Nicastro | |
| 6,758,754 B1 | 7/2004 | Lavanchy et al. | |
| 7,056,217 B1 | 6/2006 | Pelkey et al. | |
| 7,275,994 B2 | 10/2007 | Eck et al. | |
| 7,491,123 B2 | 2/2009 | Smith | |
| 7,614,955 B2 | 11/2009 | Farnham et al. | |
| 7,651,392 B2 | 1/2010 | Pennington et al. | |
| 7,686,690 B2 | 3/2010 | Miura et al. | |
| 7,780,533 B2 | 8/2010 | Yamauchi et al. | |
| 7,785,197 B2 | 8/2010 | Smith | |
| 7,787,972 B2 | 8/2010 | Schlottmann et al. | |
| 7,846,024 B2 | 12/2010 | Graepel et al. | |
| 7,896,734 B2 | 3/2011 | Kaminkow et al. | |
| 7,955,175 B1 | 6/2011 | Holloway et al. | |
| 8,002,618 B1 | 8/2011 | Lockton et al. | |
| 2004/0143852 A1 | 7/2004 | Meyers | |
| 2005/0033601 A1* | 2/2005 | Kirby et al. | 705/1 |
| 2005/0192097 A1 | 9/2005 | Farnham et al. | |
| 2006/0035692 A1* | 2/2006 | Kirby et al. | 463/6 |
| 2006/0287096 A1 | 12/2006 | O'Kelley et al. | |
| 2007/0243936 A1 | 10/2007 | Binenstock et al. | |
| 2008/0220870 A1 | 9/2008 | Zavolas et al. | |
| 2008/0242421 A1 | 10/2008 | Geisner et al. | |
| 2008/0287190 A1 | 11/2008 | Fulton et al. | |
| 2009/0325712 A1 | 12/2009 | Rance | |
| 2010/0317430 A1 | 12/2010 | Multerer et al. | |
| 2011/0201395 A1* | 8/2011 | Bansi et al. | 463/6 |

OTHER PUBLICATIONS

World of Tanks, European Server, Technical Support Service, Free experience, 1 page, Jul. 7, 2011.

(Continued)

*Primary Examiner* — Paul A. D'Agostino
*Assistant Examiner* — Ankit Doshi
(74) *Attorney, Agent, or Firm* — Banner & Witcoff, Ltd.

(57) ABSTRACT

Methods and systems for performing smart matchmaking in a massive multiplayer online game are described herein. A video game such as a vehicle-based combat game may include multiple types of vehicles, where each type of vehicle may progress through increasing tier levels. Different types of vehicles within the same tier may have different capabilities, strengths, and weaknesses. When performing matchmaking for a game session, a matchmaking server may use a battle level table defining permissible tiers of each type of vehicle allowed within a particular battle level, and may also limit the number of a specific type of vehicle allowed in any one game session. The battle table may provide an advantage to premium vehicles by limiting the tiers of other vehicles against which a similarly tiered premium vehicle may compete. Battle level difficulty may be adjusted by adjusting the ranges of permissible vehicles in each battle level.

30 Claims, 9 Drawing Sheets

OTHER PUBLICATIONS

World of Tanks [Archive]—Game portal NORD OST, downloaded from <forum.mordost.su/archive/index.php/t-7557.html>, 30 pages, Jun. 15, 2010.

World of Tanks Game Manual, Wargaming.net, 75 pages.

World of Tanks, Wikipedia article Aug. 16, 2010 in Russian with English translation, 18 pages.

Jens Riegelsberger, et al, "Personality Matters: Incorporating Detailed User Attributes and Preferences into the Matchmaking Process", downloaded from <http://research.microsoft.com/en-us/groups/scg/profiles_and_matchmaking.pdf>.

"An In-Depth Evaluation of the Architecture, Protocols and Matchmaking Algorithms Behind Online Gaming", downloaded from <http://mms.ecs.soton.ac.uk/2011/papers/22.pdf>.

"Fictional Scenario", downloaded from <http://hornbeam.cs.ucl.ac.uk/philip/reinvent06/presentations/scenario2.pdf>.

"Xbox 360 Field Manual", UNSC Department of Doctrine and Training, downloaded from <www.xbox.com/haloreach>.

Apple, Inc. "Game Kit Programming Guide", Jul. 17, 2012, downloaded from <http://developer.apple.com/library/ios/documentation/NetworkingInternet/Conceptual/GameKit_Guide/GameKit_Guide.pdf>.

Tobias Fritsch, et al., "The Next Generation of Competitive Online Game Organization", downloaded from <http://www.benjaminvoigt.eu/tf/the_next_generation_of_cogo.pdf>.

* cited by examiner

```
                    551        555
       553  ╲      ╱          ╱
            ┌─────────────────────┐
            │       Vehicle       │
            ├─────────────────────┤
            │ Attributes:      561│
            │ Name: Liechttraktor ╱
            │                  563│
            │ Hit Points: 110  ╱  │
            │ Weight/Load limit: 7.5/9.2 ——564
            │ Engine Power (h.p.) = 51 ——565
       557  │ Speed Limit = 46 km/h  ——566
            │ Hull Armor (front/side/rear mm)= 14/12/12 ——567
            │ Turret Armor (front/side/rear mm) = 14/12/12 ——568
            │ Standard Shell Damage = 24-40  ——569
            │ Standard Shell Penetration (mm) 26-43 ——570
            │ Rate of Fire (rounds/min) = 30  ——571
            │ Turret Traverse Speed (deg/sec) ——572
            │ View Range (m) = 270    ——573
            │ Signal Range (m)= 100   ——574
            ├─────────────────────┤
            │ Module:         575 │
            │ Gun: 37 mm M-5  ╱   │
            │                 576 │
            │ Turret: D37812  ╱   │
            │                     │——577
            │ Engine: Continental W-670
            │ Suspension: Stuart E1 ——578
       559  │ Radio: SCR 209  ——579
            │ Additional:     ——580
            └─────────────────────┘

FIG. 5B
```

| Vehicle tier | Type \ Battle level | 1 | 2 | 3 | 4 | 5 | 6 | 7 | 8 | 9 | 10 | 11 | 12 | 13 | N |
|---|---|---|---|---|---|---|---|---|---|---|---|---|---|---|---|
| 1 | Light | ▓ | ▓ | | | | | | | | | | | | |
| | Light | | ▓ | ▓ | | | | | | | | | | | 6 |
| | Medium | | ▓ | ▓ | | | | | | | | | | | 6 |
| | SPG | | ▓ | ▓ | | | | | | | | | | | 2 |
| 2 | Tank Destroyers | | ▓ | ▓ | | | | | | | | | | | 8 |
| | Light | | | ▓ | ▓ | ▓ | ▓ | | | | | | | | 9 |
| | Medium | | | ▓ | ▓ | ▓ | ▓ | | | | | | | | 9 |
| | SPG | | | | ▓ | ▓ | ▓ | | | | | | | | 8 |
| 3 | Tank Destroyers | | | ▓ | ▓ | ▓ | ▓ | | | | | | | | 8 |
| | Light | | | | ▓ | ▓ | ▓ | ▓ | ▓ | ▓ | | | | | 18 |
| | Medium | | | | ▓ | ▓ | ▓ | ▓ | | | | | | | 12 |
| | Heavy | | | | ▓ | ▓ | | | | | | | | | 6 |
| | SPG | | | | | ▓ | ▓ | ▓ | | | | | | | 8 |
| 4 | Tank Destroyers | | | | ▓ | ▓ | ▓ | ▓ | ▓ | | | | | | 12 |
| | Light | | | | | ▓ | ▓ | ▓ | ▓ | ▓ | ▓ | | | | 18 |
| | Medium | | | | | ▓ | ▓ | ▓ | ▓ | | | | | | 12 |
| | Heavy | | | | | ▓ | ▓ | ▓ | ▓ | ▓ | | | | | 15 |
| | SPG | | | | | | ▓ | ▓ | ▓ | | | | | | 8 |
| 5 | Tank Destroyers | | | | | ▓ | ▓ | ▓ | ▓ | | | | | | 12 |
| | Light | | | | | | ▓ | ▓ | ▓ | ▓ | ▓ | ▓ | | | 16 |
| | Medium | | | | | | ▓ | ▓ | ▓ | ▓ | ▓ | | | | 15 |
| | Heavy | | | | | | ▓ | ▓ | ▓ | ▓ | ▓ | ▓ | | | 18 |
| | SPG | | | | | | | ▓ | ▓ | | | | | | 6 |
| 6 | Tank Destroyers | | | | | | ▓ | ▓ | ▓ | ▓ | ▓ | | | | 15 |
| | Light | | | | | | | ▓ | ▓ | ▓ | ▓ | ▓ | | | 15 |
| | Medium | | | | | | | ▓ | ▓ | ▓ | ▓ | ▓ | | | 15 |
| | Heavy | | | | | | | ▓ | ▓ | ▓ | ▓ | ▓ | ▓ | | 18 |
| | SPG | | | | | | | | ▓ | ▓ | | | | | 6 |
| 7 | Tank Destroyers | | | | | | | ▓ | ▓ | ▓ | ▓ | ▓ | | | 15 |
| | Medium | | | | | | | | ▓ | ▓ | ▓ | ▓ | ▓ | | 16 |
| | Heavy | | | | | | | | ▓ | ▓ | ▓ | ▓ | ▓ | | 18 |
| | SPG | | | | | | | | | ▓ | ▓ | ▓ | | | 3 |
| 8 | Tank Destroyers | | | | | | | | ▓ | ▓ | ▓ | ▓ | ▓ | | 18 |
| | Medium | | | | | | | | | ▓ | ▓ | ▓ | ▓ | | 18 |
| | Heavy | | | | | | | | | ▓ | ▓ | ▓ | ▓ | | 18 |
| 9 | Tank Destroyers | | | | | | | | | ▓ | ▓ | ▓ | ▓ | | 18 |
| 10 | Heavy | | | | | | | | | | ▓ | ▓ | ▓ | | 6 |
| | Premium Vehicles | | | | | | | | | | | | | | |
| 2 | usa:T2_L | | ▓ | ▓ | ▓ | ▓ | | | | | | | | | 9 |
| 3 | ussr:M3 | | | ▓ | ▓ | ▓ | ▓ | | | | | | | | 8 |
| 3 | ussr:BT-SV | | | ▓ | ▓ | ▓ | ▓ | | | | | | | | 8 |
| 3 | ussr:T-127 | | | ▓ | ▓ | ▓ | ▓ | | | | | | | | 8 |
| 4 | ussr:Valentine | | | | ▓ | ▓ | | | | | | | | | 4 |
| 5 | usa:T1_hvy | | | | | ▓ | ▓ | ▓ | ▓ | | | | | | 12 |
| 5 | ussr:Churchill | | | | | ▓ | ▓ | | | | | | | | 8 |
| 5 | usa:T14 | | | | | ▓ | ▓ | | | | | | | | 8 |
| 5 | usa:M4A2E4 | | | | | ▓ | ▓ | | | | | | | | 8 |
| 8 | china:Ch01_Type59 | | | | | | | | ▓ | | | | | | 4 |
| 8 | ussr:KV-5 | | | | | | | | ▓ | | | | | | 4 |
| 8 | germany:Lowe | | | | | | | | ▓ | ▓ | | | | | 6 |

DYNAMIC BATTLE SESSION MATCHMAKING IN A MULTIPLAYER GAME

FIELD

Aspects of the disclosure relate to computer systems, computer software, and video games. More particularly, aspects of the disclosure relate to video game software, administering massive multiplayer online games, matching players in multiplayer online games based on player experience level, character experience level, and/or vehicle experience levels, and playing video games.

BACKGROUND

Video games are increasingly popular. Online multiplayer video games have become particularly popular due, at least in part, to the ability of players to compete with multiple other human players.

Popular genres of multiplayer games include the first-person-shooter (FPS) and the third-person shooter genres. In FPS games, the player's on-screen view simulates the view of the character or vehicle controlled by the player; that is, the first-person view. The object of many FPS games is to accomplish a goal within a game. Common goals include killing other game characters that represent other players, capturing flags that represent opponents' territory, assaulting another team's base, and the like. Third person shooter games often have similar goals but differ in the perspective of the player. In third person shooters, the player views the game world from above or behind the character or vehicle controlled by the player.

Because online multiplayer games have become increasingly common, there is substantial competition between the offered games regarding obtaining and retaining consumers. Repetitive play can often lead to players becoming bored with a particular game. In addition, if a player finds a game too hard or too easy, the player may become frustrated or bored, and cease playing prematurely.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, the present invention is directed to methods and systems for performing matchmaking in a multiplayer online video game. According to an aspect, matchmaking may be performed by receiving at a matchmaking server a battle session request from each of a plurality of client devices, where each battle session request identifies a vehicle to be used in the game. Each vehicle has a vehicle type and vehicle tier. The game may include a plurality of different vehicle types, and a plurality of different hierarchical vehicle tiers. Matchmaking may further include assigning each vehicle to a battle session based on a battle level table defining a permissible range of battle levels for each vehicle based on vehicle type and vehicle tier, and then initiating the battle session with each of the assigned vehicles.

The method may be performed based on instructions stored on a statutory computer readable medium, or executed by a matchmaking server configured to perform as described herein.

According to various aspects, a first vehicle type of a first tier may be associated with a first range of battle levels, and a second vehicle type of the first tier may be associated with a second range of battle levels different from the first range of battle levels.

According to other aspects, each vehicle may be one of a standard vehicle and a premium vehicle, where a first premium vehicle is associated with a lower range of battle levels than a first standard vehicle of a same tier and/or type as the first premium vehicle.

In some aspects, assigning may include calculating the permissible range of battle levels as a function of a number of battle sessions previously played using the vehicle. In one specific aspect, the calculating may be performed by determining a current maximum permissible battle level C based on the following: For $B<N$: $C=L+(B-1)((M-L-1)/N)$; For $B \geqq N$: $C=M$, where L represents a lowest battle level defined the battle level table for the vehicle type and vehicle tier of the vehicle, M represents the maximum battle level defined the battle level table for the vehicle type and vehicle tier of the vehicle, B represents the number of battles previously played using the vehicle, rounding to a nearest integer value.

These and other aspects will be apparent upon reading the detailed description below.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5B illustrates an instance of a vehicle object according to various features described herein.

FIG. 8 illustrates battle level table according to an illustrative embodiment described herein.

DETAILED DESCRIPTION

In the following description of the various aspects, reference is made to the accompanying drawings, which form a part hereof, and in which is shown by way of illustration how various features described herein may be practiced. It is understood that other embodiments may be used and structural and functional modifications may be made.

Figure 1:
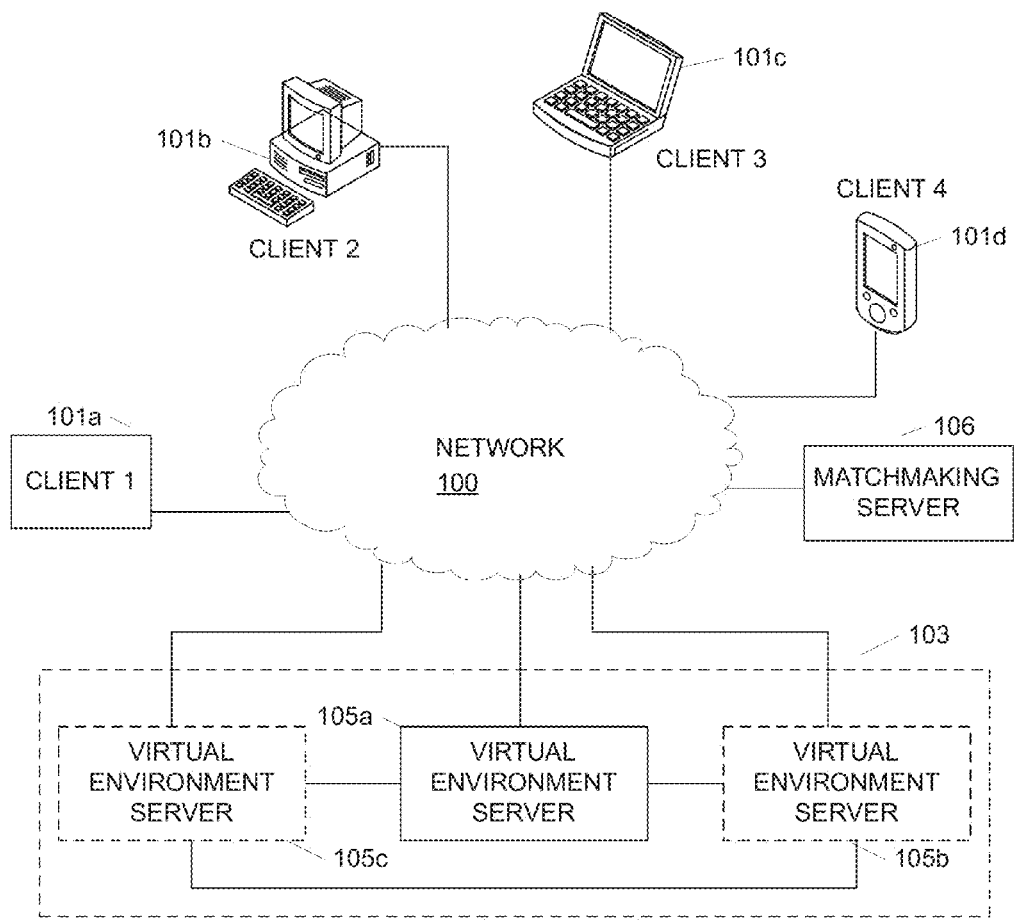
FIG. 1 is an illustrative network environment in which one or more aspects described herein may be used.

FIG. 1 illustrates a network environment in which clients 101 may interact with virtual world servers 105 to provide a virtual world for users to access. Clients 101 may include a variety of devices including generic data processing device 101a, personal computer (PC) 101b, laptop, portable, or netbook computer 101c, personal data assistant, mobile phone or device 101d, a tablet device (not shown) and the like. Each of clients 101 may have a network adapter that allows clients 101 to connect to virtual world servers 105 through network 100. In one example, network 100 may include an Internet Protocol (IP) based network, e.g., the Internet. Other networks may include cellular networks, cable networks, fiber optic networks, wireless networks, wired network and/or combinations thereof. Network 100 may further include one or more sub-networks such as wired or wireless local area networks (LANs), wide area networks (WANs), and the like.

In one or more arrangements, virtual world servers 105 may be included in a virtual world server system 103 that includes multiple linked physical and/or logical servers 105. Using such a distributed system, servers 105 may be able to distribute load across each of server 105. For example, if server 105a is experienced high loads, some of the operations may be passed to either server 105b or 105c or both. Load may further be distributed based on user geography or on other predetermined bases. Alternatively, the virtual world may be hosted on a single server, e.g., virtual world server 105a. Each of servers 105 may collectively generate and manage a single instance of the virtual world, or each server 105a, 105b and 105c may provide independent instances of the world. An instance of a virtual world, as used herein, describes a stand-alone instance of the virtual world that does not interact with or depend on other instances of the virtual world. Depending on the processing load, a virtual world server system 103 may divide a plurality of users among multiple instances of the virtual world, to reduce or alleviate overloading on a single server or prevent overpopulation. Each server 105 may be logical or physical, e.g., multiple logical servers may reside and be running on the same physical computing device/server, or servers may be physically separate devices.

The network environment of FIG. 1 may also associate with one or more matchmaking servers 106. As used herein, a matchmaking server 106 may determine what set of players to assign to a same instance of the virtual world to ensure that all players meet predefined criteria for that instance of the virtual world. That is, if extremely experienced players are paired with complete novices, the experienced players may quickly become bored, while the novice players may quickly become frustrated, causing each of them to stop playing the game altogether. Thus, the matchmaking server(s) 106 determine how to assign players to an instance of a virtual world so that every player is challenged, without getting frustrated. Specific algorithms and techniques used for matchmaking are described in more detail below.

Figure 2:
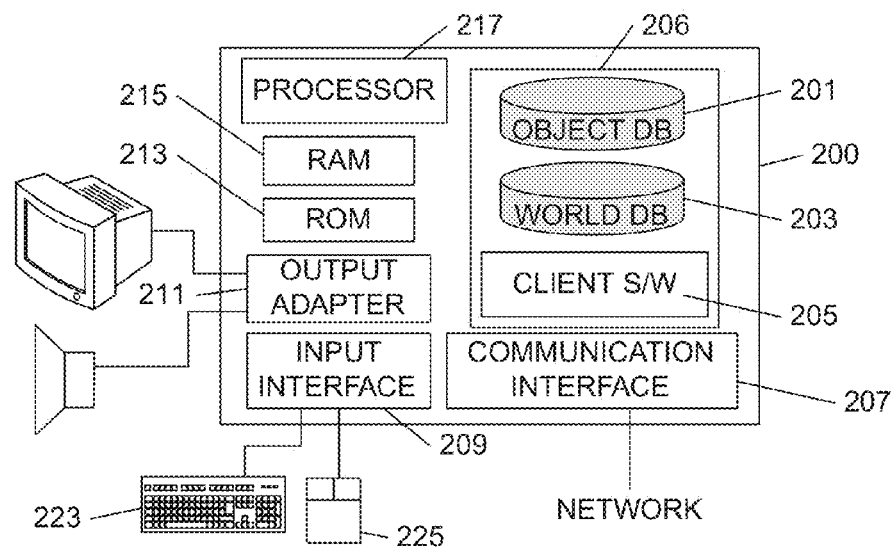
FIG. 2 is a block diagram illustrating an example virtual world client according to one or more aspects described herein.

FIG. 2 illustrates an example client device 200 such as PC 101b (FIG. 1) that may be used to access and interact with a virtual world provided by a virtual world server such as server 105a of FIG. 1. Client device 200 may include a variety of components and modules including a processor 217, random access memory (RAM) 215, read only memory (ROM) 213, databases 201 and 203, client software 205, output adapter 211, input interface 209 and communication interface 207. Software, databases, operating systems, and the like may be stored in nonvolatile memory 206 (e.g., a magnetic disk or solid state hard drive, or equivalent). Object database 201 may be configured to store data defining and otherwise associated with an object used by a user of device 200 to explore and interact with the virtual world. World database 203, on the other hand, may be configured to store data for defining and generating the environment in which the objects exist. For example, world database 203 may store texture maps for rendering a floor or ground, walls, a sky and the like. In another example, world database 203 may store simulated environments, buildings, trees and other data defining animate or inanimate objects existing in the world, data defining computer controlled characters and the like. Each of database 201, 203 may or may not be a conventional database, and instead may refer to data stored in a memory, accessed as needed by the client software. Data associated with an object or the virtual world may be communicated between client device 200 and a virtual world server using communication interface 207. For example, object positions, attributes and status may be updated or environments may be changed by communicating such data through interface 207.

The world and the objects may be graphically rendered by client software 205 and subsequently sent to output adapter 211 and display 219. The client software 205 may, in one or more arrangements, be configured to generated three dimensional (3-D) models of the virtual world and components thereof as well as the object corresponding to a user. A user may control the object and interact with the world through input interface 209 using various types of input devices including keyboard 223 and mouse 225. Other types of input devices may include a microphone (e.g., for voice communications over the network), joysticks, motion sensing devices and/or combinations thereof. In one or more arrangements, music or other audio such as speech may be included as part of the virtual world. In such instances, the audio may be outputted through speaker 221.

Client software 205, computer executable instructions, and other data used by processor 217 and other components of client device 200 may be stored RAM 215, ROM 213, nonvolatile memory 206 or a combination thereof. Other types of memory may also be used, including both volatile and nonvolatile memory. Software 205 may provide instructions to processor 217 such that when the instructions are executed, processor 217, client device 200 and/or other components thereof are caused to perform functions and methods described herein. In one example, instructions for generating a user interface for interfacing with the virtual world server may be stored in RAM 215, ROM 213 and/or nonvolatile memory 206. Client software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

Figure 3:
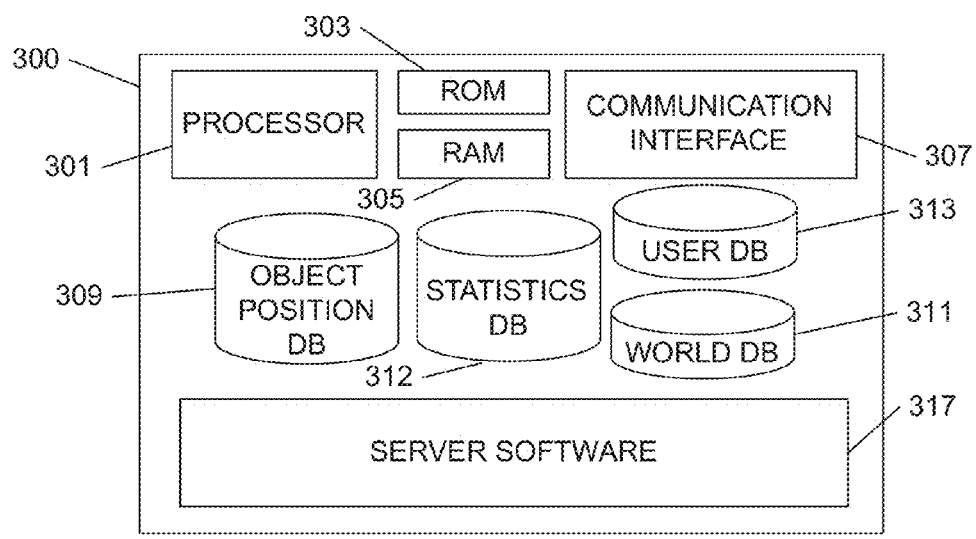
FIG. 3 is a block diagram illustrating an example virtual world server according to one or more aspects described herein.

Referring now to FIG. 3, a virtual world server 300 (e.g., an instance of server 105) may be configured to generate and operate a massive multiplayer online game, such as virtual world or the like. Server 300 may include processor 301, ROM 303, RAM 305, communication interface 307, object position database 309, world database 311, user database 313, server software 317, and a statistics database 312. Object position database 309 may be configured to store position information for each object (e.g., based on commands to move a vehicle received from each client). The statistics database 312 may be configured to store and/or transfer statistics relevant to game operation, including, for example, tracking player achievement and general game server performance.

A world database 311 may store rules, algorithms and other data for interactions that are available in the world. For example, a manner in which a computer controller character moves or otherwise behaves may be defined in data stored in world database 311. Additionally, item information may be defined in world database 311 so that items may not be modified by each client. In another example, world database 311 may store location information for non-object items and components. User database 313, on the other hand, may be configured to store information describing a user controlling an object. For example, user database 313 may include account information, user preferences, one or more classes of user experience points and/or levels, payment information, user identification information, character definitions, state tables, and the like. Each of databases 309, 311, 312, 313 may or may not be a conventional database, and instead may refer to data stored in a memory, accessed as needed by the server software. For example, user database 313 may in fact be a collection of multiple databases or database tables.

Features described herein may be used with or in a variety of video games, including but not limited to, WORLD OF TANKS™ by Wargaming.net®. Aspects described herein may also be used with other video games and are not limited to any one genre or implementation. Aspects described herein may be implemented in video game application software stored on a computer readable medium, e.g., storage 201, 203, 205, 206, 213, 215, 309, 311 312, and/or 313, and executable by a data processing device.

Various aspects of the disclosure provide features and capabilities that enhance game play by providing options through which users can develop strategies to play the video game. According to various aspects described herein, a video game may provide a graphically stimulated virtual world or virtual environment, in which the game takes place, referred to herein interchangeably as a virtual world and as a simulated environment of the video game. The simulated environment may have features similar to actual geographic locations or may have fictional, science fiction or fantasy-themed environments.

According to various aspects, the game may involve multi-player combat-based tournaments combined with an experience-based reward system. As users accomplish predefined tasks or achievements within the game, the player may be given one or more types of reward points or experience points. Reward points may subsequently be exchanged for in-game items, goods, features, etc., or otherwise used in accordance with one or more aspects described herein. In one example, reward points may be used to initiate or perform "research" to unlock more powerful, stronger, or otherwise more desirable elements within the game. The discussion below indicates various features and items that may be researched and used, as a player develops a character or vehicle within the game. As players research and purchase more advanced technologies, those players advance in skill and ability, which also affects how those players should be matched against other players in the game by matchmaking server 106.

Figure 4:
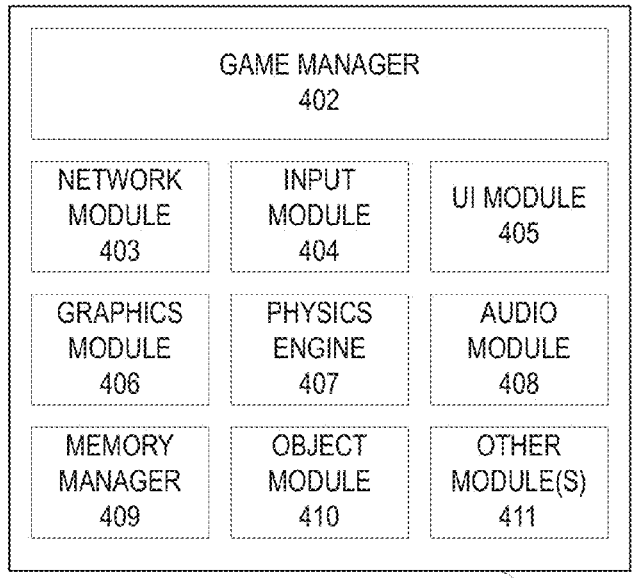
FIG. 4 illustrates a block architecture diagram of software modules that may be used to implement various features described herein.

FIG. 4 illustrates a block diagram of a video game software application 401. Each block in FIG. 4 illustrates a logical software module or function that performs an action, provides a capability or feature, implements an object, or performs some other aspect of the video game. When the video game software 401 executes on a data processing system such as a PC or game console, the modules operate collectively to provide a video game experience to a player. The modules illustrated in FIG. 4 are illustrative only, and additional or different modules may be used. The same, additional or different modules may be executed in tandem on a server with which each client device is connected.

Video game software 401 may include, e.g., a game manager module 402, which manages the overall operation of the video game and may be the initial module launched when the video game is executed. Video game software 401 may also include a network module 403, which manages network games sessions and communication with one or more game servers. A network game session may include e.g., a cooperative campaign with other networked players, or other compartmentalized periods of game play involving players located at discrete network locations. A memory manager module 409 performs memory management during execution of the video game 401. An input module 404 may receive and interpret user input via a game controller, keyboard, mouse, and the like, and provide the interpreted commands to game manager 402, network module 403, or other applicable module. UI module 405 may manage and control the user interface, including the display displayed on the video output device, interpreting input via the input module 404, and providing audio output via audio module 408.

Various software modules may operate with one or more classes or objects defined and used in the video game 401. The classes and objects may be defined with reference to an object module 410, and may include portions of executable software code and/or one or more data structures, depending on the object. Each object may be rendered and simulated in the virtual world in accordance with a physics engine 407. Video game software 401 may include other software modules 411 as needed. FIG. 4 illustrates one possible software architecture. Others may be used. Each module depicted in FIG. 4 may communicate directly or indirectly with each other module, e.g., by passing objects, data, parameters, input, and output, etc.

A first class of in-game objects may define characters in the video game. Characters may be defined by various attributes associated with the character, e.g., name, physical appearance, skills, etc. Skills may be defined based on a character's genre or task, e.g., gunners, tank commanders, and drivers in the present example. A gunner may have skills such as aiming accuracy and aiming speed, a tank commander may have skills that regulate the overall efficiency of the tank crew, a driver may have skills that determine the vehicle speed or precision of direction. Additional character attributes may include one or more other skills that can improve performance of the character or vehicle so as to enhance the strategic gaming experience such as firefighting skills, the ability to repair vehicles, the ability to camouflage vehicles, and the like.

A second class of in-game objects may define vehicles in the video game. A vehicle may be defined as any simulated inanimate object directly or indirectly controllable by or dependent on an in-game character or user/player. Illustrative vehicles may include tanks, airplanes, ships (and/or submarines), and the like. Vehicles may have various attributes and functions that provide advantageous qualities to the vehicle during combat. For example, some vehicles might be fast with minimal firepower, whereas other vehicles may be slower but extremely powerful. Infinite variations of strength, speed, defense, and any other attribute are possible.

Object module 410 may provide an array of vehicles, vehicle components, characters and other equipment. Vehicles, vehicle components, characters and other equipment may be defined by one or more objects and instantiated during the game. Each object may have various attributes and functions and provide advantages and disadvantages based thereon. A vehicle component may refer to an upgradeable component of a vehicle, e.g., armor plating, engine, guns, etc.

Figure 5A:
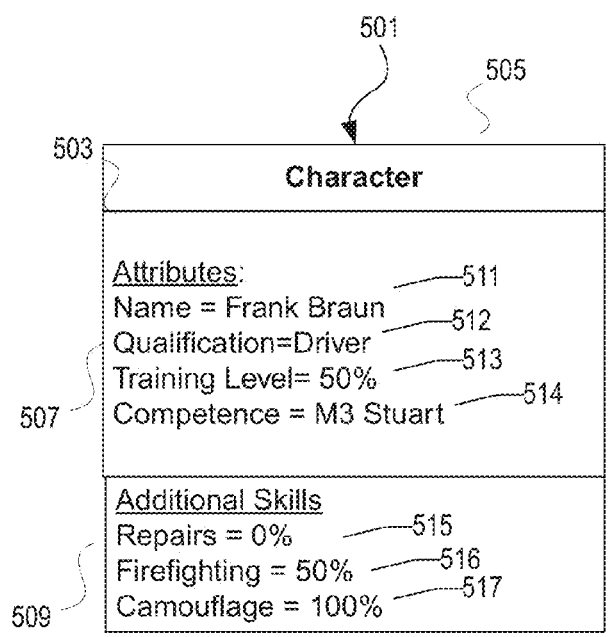
FIG. 5A illustrates an instance of a character object according to various features described herein.

FIG. 5A illustrates a block diagram of an instance 501 of a character object. Object instance 501 has an object class 505 (Character). Instance 501 may acquire one or more attributes from the object class. Attributes 507, when examined, define a state of the instance. In this example, the Character has the following attributes: Name 511, Qualification 512, Training Level 513, and Competence 514. A character may also have additional skill types 509. Additional skill types may include Repair Skills 515, Firefighting skills 516, and Camouflage skills 517. Other skill types, attributes, etc., may also or alternatively be used.

Each attribute may have a particular value. The attribute may have a default value inherited from the Qualification type 512. For some attributes, a player may increase attribute value by allocating experience points, gained during gameplay, to the character. Increased attribute value enhances gameplay by improving performance of the vehicle containing the characters. For example, by allocating experience points to the gunner of a tank, the Training Level 513 may be increased resulting in more accurate gun pointing by a vehicle containing that character, leading to improved vehicle performance during battle. Similarly, the effectiveness of the additional skill types is increased in accordance with the value of the skill. Thus, for example, a Firefighting skill 516 value of 100% is proportionally more effective than a value of 50%. Increased firefighting effectiveness results in reduced damage to the vehicle in the event of a fire. By staffing a vehicle with characters having improved attributes and skills, vehicle performance is maximized allowing for a more effective performance during game play.

In some embodiments, attributes might not be able to be changed. Qualification 512 may not be changed; for example, a driver may not be retrained as a gunner. A character's Competence attribute 514 refers to their ability to operate a specific vehicle type; for example a specific type of tank such as the M3 Stuart tank. Competence 514 may be changed by retraining the character to operate the same Qualification 512 on a different vehicle. Changing Competence 514 may result in a decreased Training Level 513 in the new vehicle. Additional experience points may be used to raise the Training Level 513 in the new vehicle. A character may eventually be associated with multiple competence attributes—one per vehicle the character has been associated with.

FIG. 5B illustrates a block diagram of an instance 551 of a vehicle object. Object instance 551 has an object class 555 (Vehicle). Instance 551 may acquire one or more attributes 557 from the object class. Attributes 557, when examined, define a state of the instance. In this example, object instance 551 is a Liechttraktor Tank and has attributes associated with tank properties. Exemplary attributes include Name 561, Hit Points 563, Weight/Load limit 564, Engine Power (h.p.) 565, Speed Limit 566, Hull Armor 567, Turret Armor 568, Standard Shell Damage 569, Standard Shell Penetration 570, Rate of Fire 571, Turret Traverse Speed 572, View Range 573, and Signal Range 574. These attribute contribute to the vehicle's effectiveness in combat. Attribute types may also have an attribute value, which determines the effectiveness of the attribute function. For example, the Speed Limit attribute 566 has a value of 46 km/h, which indicates how fast the vehicle can travel. One or more of the attributes, alone or in combination, may be used to assign the vehicle to a subclass. In this example, vehicle 551 may be in a subclass of tanks referred to as "Light Tanks" based on hit points, speed, armor, etc. Other classes of tanks may include medium tanks and heavy tanks, among others. Subclass may be used to quickly identify to a user a general approximation of attributes associated with a vehicle without requiring the user to review each attribute in detail.

Aspects of the disclosure involve altering object attributes in response to experience obtained within the game. Altering attributes provides for enhancing the skills of the character and enhancing properties of vehicle and vehicle components. Altered attributes provides the game player with vehicle and characters able to compete more effectively against other players.

Using Modules to Upgrade Vehicle Attributes

Vehicle attributes may be altered by adding or upgrading modules associated with a vehicle. A vehicle contains modules classes 559. Each module class may contain one of a variety of module types appropriate to the module class. In one example, module classes may include Gun 575, Turret 576, Engine 577, Suspension 578, and Radio 579. Additional 580 modules may be added to provide additional functions or otherwise modify vehicle attributes 557. Within each class, a vehicle may be outfitted with one module type that falls within the class. For example, five increasingly powerful gun types may be available within the gun class. Similarly, there may be multiple radio types within the radio class. Adding or changing a module type alters vehicle attributes 557 based on the effectiveness of the newly installed module type. Thus, for example, if the Radio module 579 type SCR 209 is replaced by a more advanced module the Signal Range 574 attribute value may increase based on a signal range value associated with the more advanced module. An increased Signal Range value, in turn, may allow the vehicle to detect enemies at greater distances during game play, making the player more competitive against opponents and resulting in an enhanced gameplay experience for that player.

Experience Points and Research

During game play (e.g., between game sessions), new vehicles and new modules for vehicles may be unlocked by a player in exchange for experience points. In some embodiments, a user might gain points for a single experience class. In other embodiments, points may be earned for two or more different experience classes. Different experience classes may be used to gain access to different features in the game. For example, points earned in a first experience class may be used to allow a user access to a first set of game objects (e.g. vehicles and/or vehicle modules) but not a second, different set of game objects. Points earned in the second experience class may be used to allow a user access to a different set of game objects than the first experience class. The first and second sets may share some objects in common, or may instead be completely distinct.

In one example, where the first experience class is battle experience, battle experience may be used to unlock any object in the same tech tree as the vehicle in which the battle experience was earned, but may not be used to unlock objects not in the same tech tree as the vehicle in which the experience was earned. In this example, where the second experience is free experience, the free experience may be used to unlock any object in any tech tree, regardless of the vehicle in which the free experience was earned.

Collectively, the experience classes may be referred to herein as the "Primary Currency" of the game. Primary Currency is the main route for players to acquire upgraded vehicles, modules, and personnel. A second type of currency, defined herein as "Alternative Currency" may be provided to a player in exchange for alternative compensation, e.g., by completing secondary in-game tasks, completing objectives, or in exchange for the payment of money. In some embodiments, the software may allow some or all of a first experience class to be converted into one or more of the different experience classes. In some aspects, such conversion may only be permitted when a predetermined condition is met. Various predetermined conditions may be imposed. For example, the software may prevent conversion until a vehicle has been upgraded to a particular status. For example, all objects in the same tech tree as a vehicle might be required to be unlocked before conversion from the first experience class to the second experience class is permitted. Such a vehicle is said to be an "elite" vehicle or having acquired elite status. A cost may be imposed on the user for conversion (e.g., Alternative Currency).

In other aspects, players may have the option to convert Battle experience to Free experience under different conditions. For example, "Premium" vehicles may be available to a player in exchange for Alternative Currency. A Premium vehicle may refer to a vehicle similar to an elite vehicle in that the vehicle includes all possible module upgrades and vehicles within the same tech tree family, however, the Premium vehicle may be purchased for the alternative currency whereas the elite vehicle was unlocked using one or more classes of experience through gameplay. Players who purchase Premium vehicles may be permitted to convert Battle experience to Free experience without first achieving any predetermined condition in the Premium Vehicle. In other aspects, predetermined conditions imposed on Premium vehicles might be different from those imposed on non-Premium vehicles.

Figure 6A:
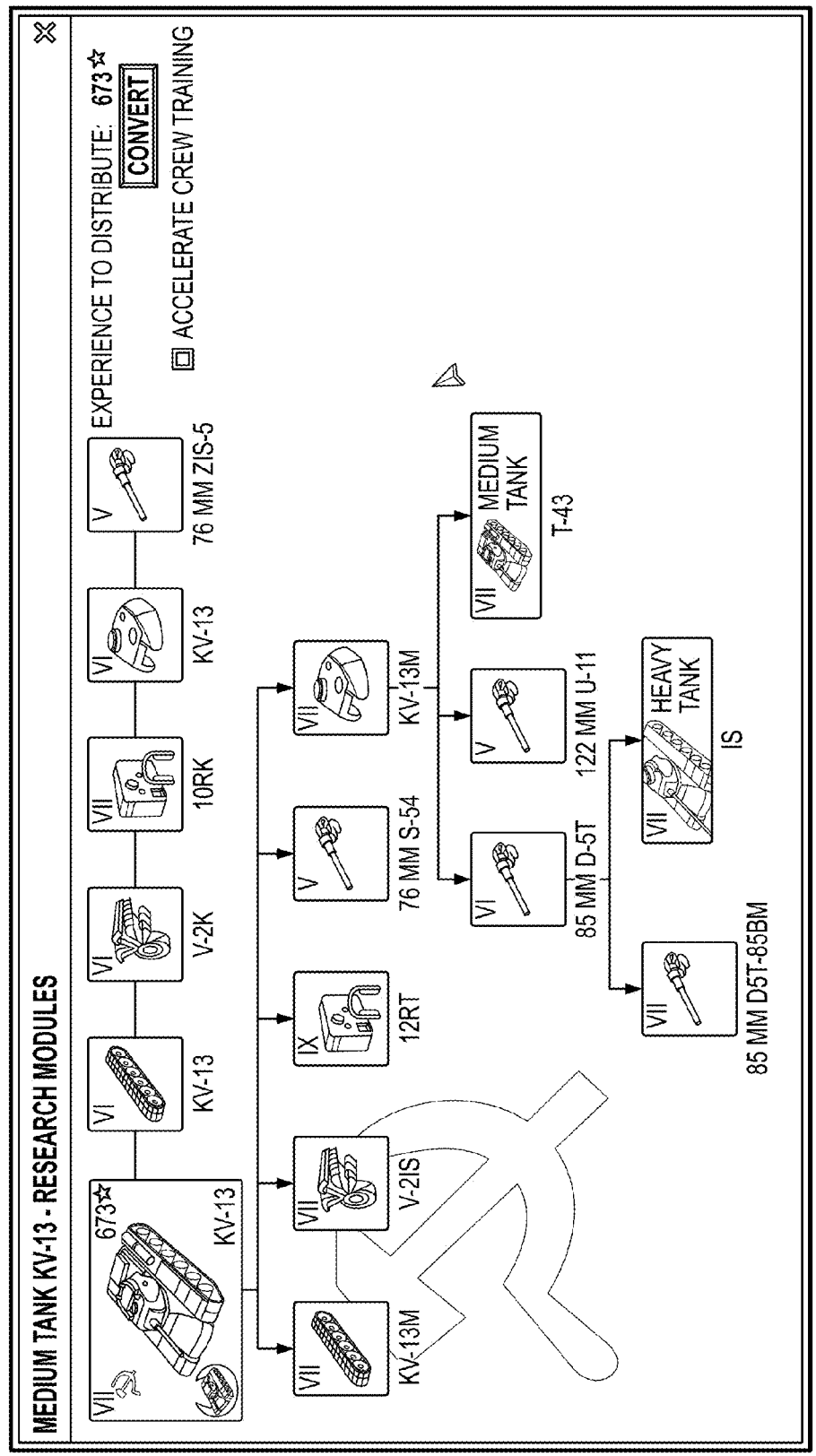
FIG. 6A illustrates a screenshot of a video game implementing one or more illustrative aspects described herein.
Figure 6B:
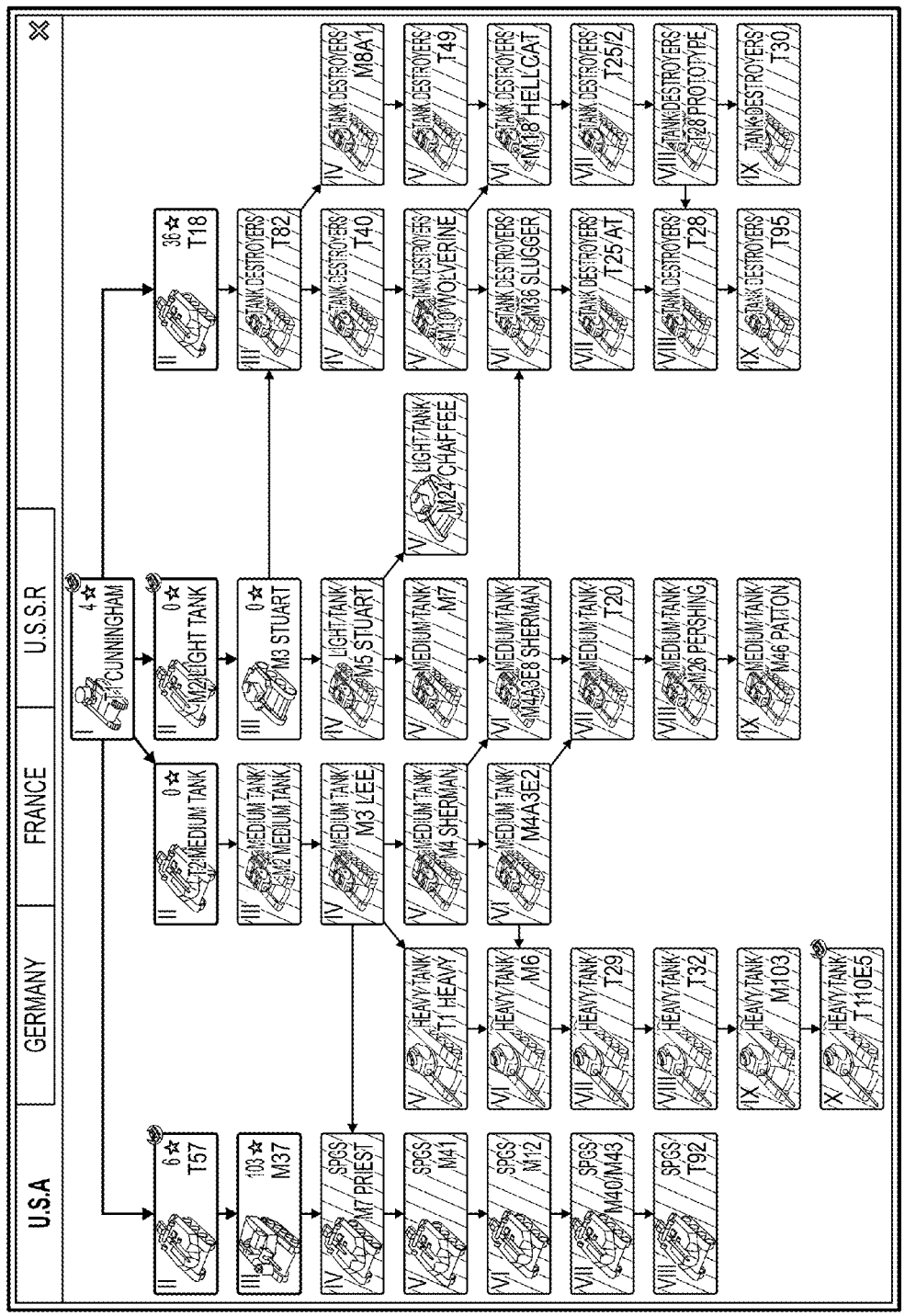
FIG. 6B illustrates a screenshot of a video game implementing one or more illustrative aspects described herein.
Figure 7:
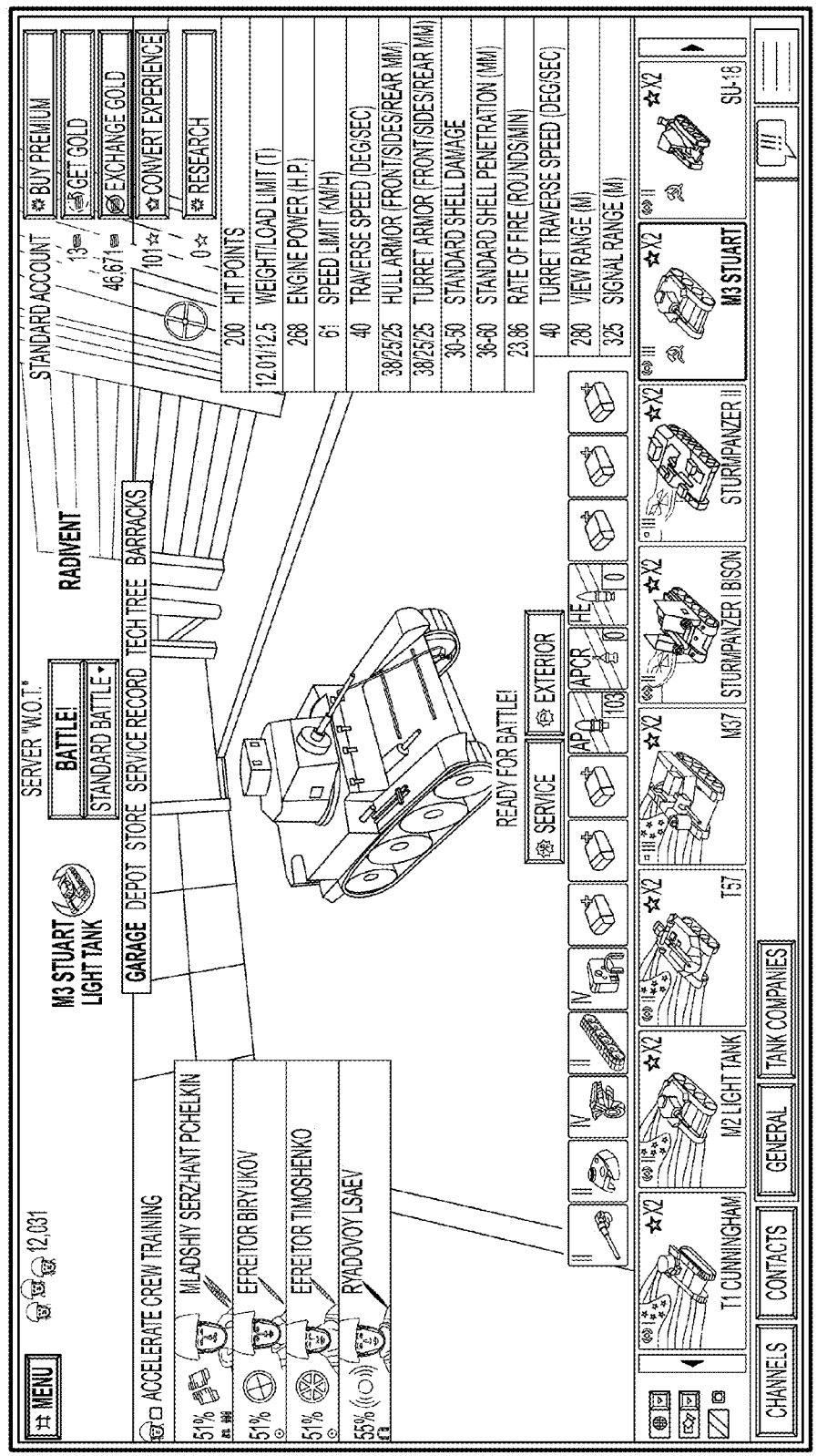
FIG. 7 illustrates a screenshot of a video game implementing one or more illustrative aspects described herein.

FIG. 6A shows a screenshot of an example tech tree (also known as a game progress tech tree) for a Medium Tank object KV-13. All modules and available tanks (e.g. T-43) present in the tech tree have been unlocked and are available for player use. FIG. 6B shows a screenshot of a tank tech tree that may be researched for a T1 Cunningham tank object. FIG. 7 is an example of a main screen of an illustrative game.

Dynamic Matchmaking

Based on the ability of players to increase the attributes of their respective characters and/or objects (in this example, tanks), players will each have different capabilities to use in game sessions. Some players may have more advanced tanks than others, resulting in a weak tank being targeted by a very strong and powerful tank, while other plays may have more advances characters than others, resulting in perhaps more accuracy or speed in a particular tank than another player using the same tank with less experienced characters acting as the crew for that tank. Based on the near infinite combination of character attributes as used with various types and strengths of vehicles, it becomes difficult to match players for a gaming session so that each player is challenged without becoming bored or frustrated.

According to an aspect, there may be five primary types of tank vehicles: Self Propelled Guns (SPG, or artillery), Light Tanks, Medium Tanks, Heavy Tanks, and Tank Destroyers. Each vehicle may also be assigned a tier rating. The higher the tier, the more powerful the vehicle is considered to be. Vehicles of tier 1 may be entry level or novice vehicles, whereas vehicles of tier 10 (or higher) may represent well armored vehicles, very fast vehicles, vehicles with powerful ammunition, etc. If a player using a tier 1 vehicle were to compete against a player using a tier 10 vehicle, the player using the tier 1 vehicle has virtually no chance of winning the game session. However, a player using a tier 4 or above vehicle may be able to compete against some tier 10 vehicles. Thus, it is important to match players against other players using characters and/or vehicles of comparable quality, while still providing a challenging game experience without being overly difficult. This is a very fine line to walk.

FIG. 8 illustrates a matchmaking table 801 that may be used according to one or more illustrative aspects described herein. A game session may be referred to as a battle session. A game session/battle session refers to any discrete round of a game, e.g., a round of eliminate all enemies, capture the flag, hold the ball, and/or any other multiplayer variant of a game. In the WORLD OF TANKS brand of multiplayer game, a game session/battle session refers to two teams of 15 tanks fighting until 1) only one team has any tanks remaining, or 2) one team captures the other team's base.

Each battle session is assigned a battle level. Each battle level is used to limit participating vehicles to predefined tiers that are included in that battle session, thereby providing a unique method of creating a balanced battle session in an MMO game. As players progress and advance in experience, the player (or vehicle) will gradually be moved into higher battle levels based on the experience, attributes, and capabilities of each player's characters and/or vehicles.

Use of battle levels is based on the premise of gradual advancement through the tech tree starting with a first tier vehicle and unlocking more powerful vehicles by means of gaining battle experience or purchasing a premium vehicle. The game engine (e.g., as performed by matchmaking server) uses battle levels to manage the difficulty of each battle session. According to one aspect, the level of difficulty of a battle level is not identified or revealed in the game, and players might not be offered any option to choose a difficulty level within a battle session. However, as a matter of practice, players will typically want to obtain further upgrades by being constantly challenged, while not overloaded, in sequential game sessions.

Referring again to FIG. 8, there may be five (5) classes of vehicles in the game: Light Tank, Medium Tank, Heavy Tank, SPG and Tank Destroyer. Each class of vehicle possesses specific characteristics and a tier number. Generally, the higher the tier number is the more powerful the vehicles. Premium vehicles additionally have one or more of their own advantages. Each vehicle may be assigned a range of accessible battle levels. Vehicles of the same tier belonging to different classes may differ in their accessible battle levels ranges (e.g., Tier 4: Light vehicle has an access range to battle levels from 4 to 10; Medium—from 4 to 8; Heavy—from 4 to 5; SPG—from 6 to 10; Tank Destroyers—from 5 to 8; Premium USSR vehicle Valentine—from 4 to 5). When forming a line-up for a battle session of a certain level, appropriate vehicles with matching accessible battle levels are chosen.

The battle of a specified level (e.g., a level 6 battle session) may combine only those players whose vehicles permit access to this battle level within their range (Tier 3: all classes, Tier 4: Light, Medium, SPG and Tank Destroyers, Tier 5: Medium, Heavy, Tank Destroyers, and specified premium vehicles).

In addition to providing balanced battle sessions, the use of tier-limited battle levels provides the ability to control difficulty levels of the battle so that players of all skill levels remain challenged and wanting to play more. Players with higher tier vehicles have no access to lower battle levels, likewise lower tier vehicles are not allowed into higher battle levels. However, with one and the same vehicle players can happen to get into battle sessions of different levels within their accessibility range. By putting players into battles of varying level, the players experience a variety of game play while experiencing both wins and losses. According to one aspect, a player may be placed randomly or sequentially in any suitable battle level. However, according to another aspect, players who have just acquired a new higher tier vehicle are encouraged by being placed into battle sessions near the lower boundary of that vehicle's accessibility range, which allows the player feel more comfortable in the game. With time, the balancing system starts putting them into higher levels battle sessions, which creates a challenge of playing with more upgraded opponent vehicles. Details regarding how this aspect is performed are provided below, based on the use of the variable Nin table 801.

Premium vehicles typically have advanced capabilities compared to other vehicles of similar tiers, and may be allowed only into a lower range of battle levels than standard vehicles of a similar tier level, thereby encouraging users to obtain premium vehicles. For example, in one embedment, Tier 8 standard Heavy vehicles are allowed in battle levels from 9 to 12, while Tier 8 Heavy premium vehicles get into levels 9-10 and 9-11, thereby avoiding battle level 12. As a result, players are more likely to feel superior, and have a better chance of success in game using premium vehicles because they will never play against as difficult opponents as standard vehicles may face.

According to an aspect, the average level of difficulty in each battle can be adjusted by changing the bounds of access ranges for specified vehicles types (e.g., battle level 9 implies a certain difficulty level, which can be made easier by increasing the values of the bounds for vehicles including Tier 3 SPG, Tier 4 Medium and Tank Destroyers, or increasing the value for the lower bound of Tier 6 Light vehicles. Likewise each level 9 battle session may be increased in difficulty by decreasing the ranges for Tier 6 SPG, Tier 7 Light, Tier 9 Heavy and Tank Destroyers, and decrease the values of the bounds for Tier 5 Medium and Tank Destroyers vehicles.

Using battle levels as described herein, matchmaking servers can assign players to sessions to provide players with varied gaming experiences without frustrating or boring the player. Battle sessions are balanced while the difficulty levels of the battle session for each player are controlled.

Figure 9:
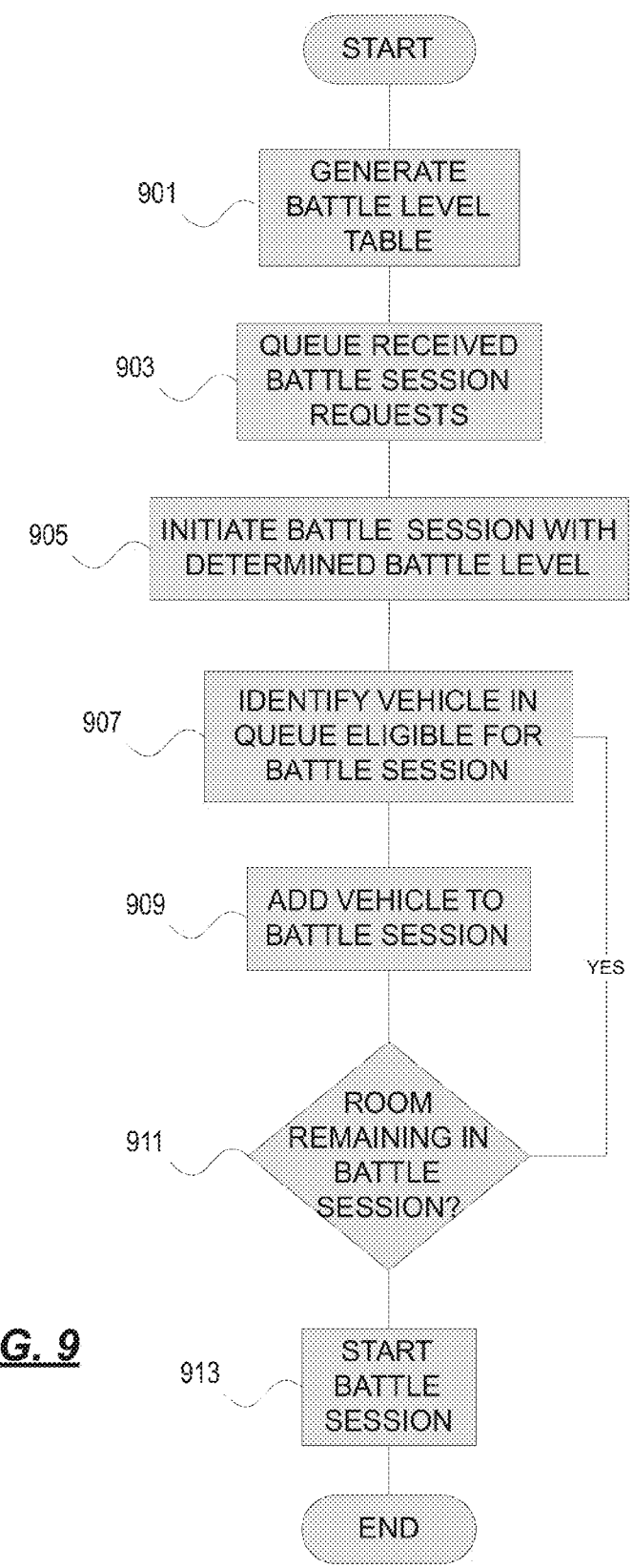
FIG. 9 illustrates a flowchart for a method of performing smart matchmaking according to an illustrative embodiment described herein.

FIG. 9 illustrates a method of performing matchmaking according to an aspect described herein. Initially in step 901, a battle level table such as table 801. Table 801 may be stored in a database, an array, a lookup table, or any other data structure usable for querying the data stored therein. Step 901 may be performed only once, and then table 801 may be reused as needed, or until table 801 is modified or replaced, e.g., to adjust difficulty of battle levels, add or remove specific vehicles, etc.

In step 903 matchmaking server 106 receives a battle session request from each of a plurality of clients, and queues the requests for allocation to a future battle session. When enough battle session requests have been received, e.g., based on a predefined minimum number of vehicles per battle session, then in step 905 matchmaking server 106 creates a battle session having a determined battle level. The battle level can be determined based on the vehicles in the queue (e.g., a battle level into which a majority of the queue is eligible), based on a sequential process of creating battle sessions of incrementing (or decrementing) battle levels, or based on any other desired criteria. The method of selecting the battle level is secondary to the assignment of a battle level to a particular battle session.

Once the battle level is selected, then in step 907 matchmaking server 106 identifies a particular vehicle in the queue that is eligible to participate in the battle session having the determined battle level, based on the information stored in battle level table 801. Step 907 may also include confirming a vehicle's eligibility based on additional criteria other than battle level. In one embodiment, matchmaking server 106 selects tanks so that a total weight of vehicles from two teams within the battle session are equal or near equal. In another embodiment matchmaking server 106 selects tanks so that a total weight of each type of vehicle on two teams is equal or near equal. In another embodiment, where each vehicle is associated with a number of player or NPC personnel required to operate the vehicle, the matchmaking server 106 may select vehicles so that the number of personnel on each of two teams is equal or near equal. In yet another embodiment, matchmaking server 106 may confirm that, when sorting each of two team's vehicles by weight in decreasing order, the weight of the first member of each team is equal or near equal.

In step 909 matchmaking server 106 adds the identified vehicle to the particular battle session, e.g., by updating a data structure or database associated with storing battle session information. In step 911, matchmaking server 106 determines whether there is room remaining in the battle session for additional vehicles. If so, matchmaking server 106 returns to step 907. If not, matchmaking server starts the battle session, e.g., by assigning the battle session to a particular game server 105, and instructing each client machine associated with a vehicle in the battle session to contact the assigned game server 105. Other ways of starting the game session are also possible, and are not limited by the example provided herein.

The method described with respect to FIG. 9 is illustrative only, and various modifications may be made. For example, matchmaking server 106 may also limit the number of a specific type of vehicle that is permitted in each battle session. Thus, even if there is room left in the battle session, and there are only vehicles of type Heavy Tank in the queue, matchmaking server might instead wait for a different vehicle type to be placed in the queue when the number of heavy tanks already in the battle session meets a predefined threshold or limit. As another example, the weight comparisons described above may be performed iteratively throughout the method as vehicles are added, and not necessarily performed at a single point in time. That is, matchmaking server 106 may select multiple vehicles at a time to add to a battle session, e.g., selecting vehicles in pairs where one vehicle of the pair is allotted to each of two teams in a battle session. Matchmaking server 106 may confirm one or more equal weights, pairs, personnel, vehicle, etc., at any time prior to starting the battle session.

In another example, even if there is room remaining in the battle session, matchmaking server 106 might proceed to start the battle session in step 913 when there are no vehicles in the queue, or no eligible vehicles in the queue, provided there are at least a predefined minimum number of vehicles assigned to the battle session. In yet another example, steps may be performed concurrently or in differing orders, such as steps 903 and 905, which may occur concurrently. Indeed, step 903 may be performed continuously while all other steps are being performed. In addition, multiple instances of the method shown in FIG. 9 may be performed concurrently to assign vehicles to different battle sessions, e.g., when there is a large backlog in the queue.

As indicated above, vehicles may be placed in a battle session having a particular battle level using a variety of techniques. In one aspect, a vehicle may be placed randomly into any battle level acceptable based on the battle level table 801. In another aspect, a vehicle may be placed sequentially in increasing battle levels based on table 801. For example, when a use acquires a new tier 4 light tank, the first time the user plays a game with that tier 4 light tank the matchmaking server might force the vehicle to be assigned to a battle session of battle level 4. When the player plays a second game session using the same tier 4 light tank, the matchmaking server might force the vehicle to be assigned to a battle session of battle level 5. The third game session, battle level 6, the fourth game session, battle level 7, and so forth until the seventh battle session where the vehicle is in battle level 10. After that, the matchmaking server might start over at battle level 4. Alternatively the sequence might proceed in decreasing battle level order, and/or might start in the middle of the applicable range of battle levels.

According to another aspect, the matchmaking server may store a win/loss percentage for each user (or vehicle) at a given battle level. As the player's win/loss ratio decreases, the player becomes more likely to be placed in battles having battle levels at the lower end of the allowable range, whereas as the player's win/loss ration increases, the player becomes more likely to be placed in battles having battle levels at the upper end of the allowable range. Thus, when a player has been repeatedly put into too many difficult battles, the balancing is done in favor of easier battle sessions, thereby encouraging the player by providing an easier game environment. Similarly, when the player has been repeatedly put into too many easy battles, the balancing is done in favor of harder battle sessions, thereby keeping the player challenged instead of letting the player become bored with easy games. A first possible algorithm is to divide the permissible battle levels evenly across a range from zero (0) to two (2), and place the vehicle into the battle level corresponding to the win/loss ratio, where any ratio greater than two (2) automatically results in the vehicle being placed in the highest possible battle level. Another possible algorithm is to increase the battle level by one (within the permissible range) for a vehicle each time a player wins a battle with that vehicle, and decrease the battle level by one (within the permissible range) each time a player loses a battle with that vehicle. If the battle level is already at the upper end of the range and the player wins the battle, the battle level may remain constant. Similarly, if the battle level is already at the lower end of the range and the player loses the battle, the battle level may remain constant.

According to yet another aspect, with reference back to FIG. 8, a variable may be defined (here, referred to as range variable N) that defines a number of battle sessions that a vehicle must participate in before the vehicle may be assigned to the highest possible battle level within its allowable range of battle levels. Range variable N is used to define a sub-range within the otherwise permissible range of battle levels for a given vehicle. In one variant, a vehicle may be placed in any battle level except the highest allowable battle level, based on any placement algorithm described herein or otherwise, until the player plays at least N battle sessions with a particular vehicle. For example, in the example shown in FIG. 8, Tier 4 SPG's are permissible in battle levels 6-10, where N=8. For the first 8 battle sessions that a player uses a particular tier 4 SPG vehicle, the vehicle is only eligible to be placed in battle levels 6-9 (e.g., matchmaking server 106 may randomly select a battle within battle levels 6-9 for that vehicle). After 8 battle sessions, for each battle session, matchmaking server 106 may randomly select a battle within battle levels 6-10).

In another variant, range variable N is used to define an incremental step by which the sub-range is gradually increased until the sub-range encompasses the full range defined in FIG. 8. In this variant, L represents the lowest battle level in the range defined in FIG. 8 for a given vehicle type/tier combination, M represents the maximum battle level defined in FIG. 8 for a given vehicle type/tier combination, B represents the number of battles previously played using a particular vehicle, and C represents a current maximum battle level calculated as a function of L, M, B, and N using equation 1, rounding to a nearest integer value (variable names are arbitrary and may be changed without changing the result).

$$\text{For } B<N: C=L+(B-1)((M-L-1)/N)$$

$$\text{For } B \geq N: C=M \quad \text{(equation 1)}$$

Thus, in a first battle with a particular vehicle, a player might only be placed in the lowest battle level of the allowed range. Each successive battle session with that vehicle, the sub-range of available battle levels may increase by (number of battle levels in full range −1)/N, until the full range defined in FIG. 8 is encompassed. For example, again using tier 4 SPG vehicles as an example, Table 1 illustrates, for each battle session that a player uses a particular tier 4 SPG, the available range of battle levels into which that vehicle may be placed.

TABLE 1

Sample Battle Level Increments for Tier 4 SPG

| Battle No. (B) | Min. Battle Lvl. (L) | Current. Max. Battle Lvl. (C) | Calc. Max. Battle Lvl. (before rounding) |
|---|---|---|---|
| 1 | 6 | 6 | 6 |
| 2 | 6 | 7 | 6.5 |
| 3 | 6 | 7 | 7 |
| 4 | 6 | 8 | 7.5 |
| 5 | 6 | 8 | 8 |
| 6 | 6 | 9 | 8.5 |
| 7 | 6 | 9 | 9 |
| 8 (N) | 6 | 10 | 9.5 |
| >N | 6 | 10 | 10 |

Matchmaking server 106 may determine (e.g., in step 907 of FIG. 9), for each battle session in which a player uses a particular vehicle, the allowable sub-range based on N as explained above. The number of battle sessions in which a player has used a particular vehicle may be stored in a data structure or object associated with the vehicle, e.g., as an attribute in instance 551 (FIG. 5B). Once the sub-range is calculated, matchmaking server 106 randomly (or otherwise) selects a battle level within the sub-range for that player/vehicle, and may add the player/vehicle to the battle session in step 909 (FIG. 9).

The information presented in FIG. 8 is illustrative only, and may change from time to time. Battle level tables may be changed to maintain dynamic and intriguing game play. Battle level tables may vary or be changed based on the strengths and weaknesses of vehicle types at different tier levels. Battle level tables may be changed based on an analysis of vehicle performance and battle session results. For example, if certain tier vehicles are identified as winning or losing a disproportionate number of battle sessions at a given battle level, that battle level may be adjusted as described above to make that battle level more fair. New battle level tables 801 may be published with game updates to clients, or may be adjusted at the matchmaking server without requiring a game update on the client side. Different battle level tables may be used for games using vehicles other than tanks, e.g., helicopters, planes, drones, warplanes, spacecraft, boats, ships, and/or battleships, among others.

The present aspects have been described in terms of preferred and illustrative embodiments. Numerous other embodiments, modifications and variations within the scope and spirit of the appended claims will occur to persons of ordinary skill in the art from a review of this disclosure.

The invention claimed is:

1. One or more non-transitory computer readable media storing computer executable instructions that, when executed, cause a system to perform:
   receiving a battle session request from each of a first plurality of client devices, wherein each battle session request identifies a vehicle to be used in a graphically simulated multiplayer gaming environment, said vehicle having a vehicle type and vehicle tier, wherein said graphically simulated multiplayer gaming environment includes a plurality of different vehicle types, and a plurality of different hierarchical vehicle tiers; and
   matchmaking a second plurality of client devices by assigning each eligible vehicles associated with the first plurality of client devices to a battle session based on a battle level table defining a permissible range of battle levels for each vehicle based on vehicle type and vehicle tier; and
   dividing the second plurality of client devices into two teams of vehicles within the battle session, wherein a total weight of vehicles on each of the two teams is at least near equal.

2. The computer readable media of claim 1, wherein the plurality of different vehicle types comprise light tank, medium tank, heavy tank, self-propelled artillery, and tank destroyer.

3. The computer readable media of claim 1, wherein the plurality of different vehicle tiers comprise at least 10 sequential tiers representing increasing vehicle capabilities.

4. The computer readable media of claim 1, wherein a first vehicle type of a first tier is associated with a first range of a plurality of battle levels, and a second vehicle type of the first tier is associated with a second range of a plurality of battle levels different from the first range of battle levels, wherein said first range and said second range overlap to include at least one same battle level.

5. The computer readable media of claim 1, wherein each vehicle is one of a standard vehicle and a premium vehicle, and wherein a first premium vehicle is associated with a lower range of battle levels than a first standard vehicle of a same tier as the first premium vehicle.

6. The computer readable media of claim 1, wherein each vehicle type is associated with a predefined maximum number of vehicles permissible within a same battle session having that vehicle type.

7. The computer readable media of claim 1, wherein assigning comprises calculating the permissible range of battle levels as a function of a number of battle sessions previously played using the vehicle.

8. The computer readable media of claim 7, wherein the battle level table defines a range variable N for each vehicle type and vehicle tier combination, and wherein calculating comprises:
   determining a current maximum permissible battle level C based on the following formula:

For $B<N$: $C=L+(B-1)((M-L-1)/N)$

For $B \geq N$: $C=M$ wherein L represents a lowest battle level defined by the battle level table for the vehicle type and vehicle tier of the vehicle, M represents the maximum battle level defined by the battle level table for the vehicle type and vehicle tier of the vehicle, B represents the number of battles previously played using the vehicle, rounding to a nearest integer value.

9. The computer readable media of claim 1, wherein the plurality of different vehicle types comprise airplanes.

10. The computer readable media of claim 1, wherein the plurality of different vehicle tiers comprise at least 5 sequential tiers representing increasing vehicle capabilities.

11. A method comprising:
    receiving at a matchmaking server a battle session request from each of a first plurality of client devices, wherein each battle session request identifies a vehicle to be used in a graphically simulated multiplayer gaming environment, said vehicle having a vehicle type and vehicle tier, wherein said graphically simulated multiplayer gaming environment includes a plurality of different vehicle types, and a plurality of different hierarchical vehicle tiers;
    matchmaking a second plurality of client devices by assigning each eligible vehicles associated with the first plurality of client devices to a battle session based on a battle level table defining a permissible range of battle levels for each vehicle based on vehicle type and vehicle tier;
    dividing the second plurality of client devices into two teams of vehicles within the battle session, wherein a total weight of vehicles on each of the two teams is at least near equal; and
    initiating the battle session with each of the assigned vehicles.

12. The method of claim 11, wherein the plurality of different vehicle types comprise light tank, medium tank, heavy tank, self-propelled artillery, and tank destroyer.

13. The method of claim 11, wherein the plurality of different vehicle tiers comprise at least 10 sequential tiers representing increasing vehicle capabilities.

14. The method of claim 11, wherein a first vehicle type of a first tier is associated with a first range of a plurality of battle levels, and a second vehicle type of the first tier is associated with a second range of a plurality of battle levels different from the first range of battle levels, wherein said first range and said second range overlap to include at least one same battle level.

15. The method of claim 11, wherein each vehicle is one of a standard vehicle and a premium vehicle, and wherein a first premium vehicle is associated with a lower range of battle levels than a first standard vehicle of a same tier as the first premium vehicle.

16. The method of claim 11, wherein each vehicle type is associated with a predefined maximum number of vehicles permissible within a same battle session having that vehicle type.

17. The method of claim 11, wherein assigning comprises calculating the permissible range of battle levels as a function of a number of battle sessions previously played using the vehicle.

18. The method of claim 17, wherein the battle level table defines a range variable N for each vehicle type and vehicle tier combination, and wherein calculating comprises:
    determining a current maximum permissible battle level C based on the following formula:

For $B<N$: $C=L+(B-1)((M-L-1)/N)$

For $B \geq N$: $C=M$ wherein L represents a lowest battle level defined by the battle level table for the vehicle type and vehicle tier of the vehicle, M represents the maximum battle level defined by the battle level table for the vehicle type and vehicle tier of the vehicle, B represents the number of battles previously played using the vehicle, rounding to a nearest integer value.

19. The method of claim 11, wherein the plurality of different vehicle types comprise airplanes.

20. The method of claim 11, wherein the plurality of different vehicle tiers comprise at least 5 sequential tiers representing increasing vehicle capabilities.

21. A matchmaking server comprising:
a processor; and
memory storing computer executable instructions that, when executed by the processor, cause the matchmaking server to perform:
  receiving a battle session request from each of a first plurality of client devices, wherein each battle session request identifies a vehicle to be used in a graphically simulated multiplayer gaming environment, said vehicle having a vehicle type and vehicle tier, wherein said graphically simulated multiplayer gaming environment includes a plurality of different vehicle types, and a plurality of different hierarchical vehicle tiers; and
  matchmaking a second plurality of client devices by assigning eligible vehicles associated with the first plurality of client devices to a battle session based on a battle level table defining a permissible range of battle levels for each vehicle based on vehicle type and vehicle tier; and
  dividing the second plurality of client devices into two teams of vehicles within the battle session, wherein a total weight of vehicles on each of the two teams is at least near equal.

22. The matchmaking server of claim 21, wherein the plurality of different vehicle types comprise light tank, medium tank, heavy tank, self-propelled artillery, and tank destroyer.

23. The matchmaking server of claim 21, wherein the plurality of different vehicle tiers comprise at least 10 sequential tiers representing increasing vehicle capabilities.

24. The matchmaking server of claim 21, wherein a first vehicle type of a first tier is associated with a first range of a plurality of battle levels, and a second vehicle type of the first tier is associated with a second range of a plurality of battle levels different from the first range of battle levels, wherein said first range and said second range overlap to include at least one same battle level.

25. The matchmaking server of claim 21, wherein each vehicle is one of a standard vehicle and a premium vehicle, and wherein a first premium vehicle is associated with a lower range of battle levels than a first standard vehicle of a same tier as the first premium vehicle.

26. The matchmaking server of claim 21, wherein each vehicle type is associated with a predefined maximum number of vehicles permissible within a same battle session having that vehicle type.

27. The matchmaking server of claim 21, wherein assigning comprises calculating the permissible range of battle levels as a function of a number of battle sessions previously played using the vehicle.

28. The matchmaking server of claim 27, wherein the battle level table defines a range variable N for each vehicle type and vehicle tier combination, and wherein calculating comprises:
  determining a current maximum permissible battle level C based on the following formula:

For $B < N$: $C = L + (B-1)((M-L-1)/N)$

For $B \geq N$: $C = M$ wherein L represents a lowest battle level defined by the battle level table for the vehicle type and vehicle tier of the vehicle, M represents the maximum battle level defined by the battle level table for the vehicle type and vehicle tier of the vehicle, B represents the number of battles previously played using the vehicle, rounding to a nearest integer value.

29. The matchmaking server of claim 21, wherein the plurality of different vehicle types comprise airplanes.

30. The matchmaking server of claim 21, wherein the plurality of different vehicle tiers comprise at least 5 sequential tiers representing increasing vehicle capabilities.

* * * * *

UNITED STATES PATENT AND TRADEMARK OFFICE
CERTIFICATE OF CORRECTION

PATENT NO. : 8,425,330 B1  
APPLICATION NO. : 13/472945  
DATED : April 23, 2013  
INVENTOR(S) : Victor Kislyi et al.

Page 1 of 1

It is certified that error appears in the above-identified patent and that said Letters Patent is hereby corrected as shown below:

On the title page item (73), Under Assignee:
Please delete "Wargaming.net, LLC, London (GB)" and insert --Wargaming.net, LLP, London (GB)--

Signed and Sealed this
Tenth Day of December, 2013

Margaret A. Focarino
*Commissioner for Patents of the United States Patent and Trademark Office*